April 21, 1931.  G. W. BLAIR  1,801,325
APPARATUS FOR MAKING FASTENER SLIDERS
Filed July 18, 1925   2 Sheets-Sheet 1
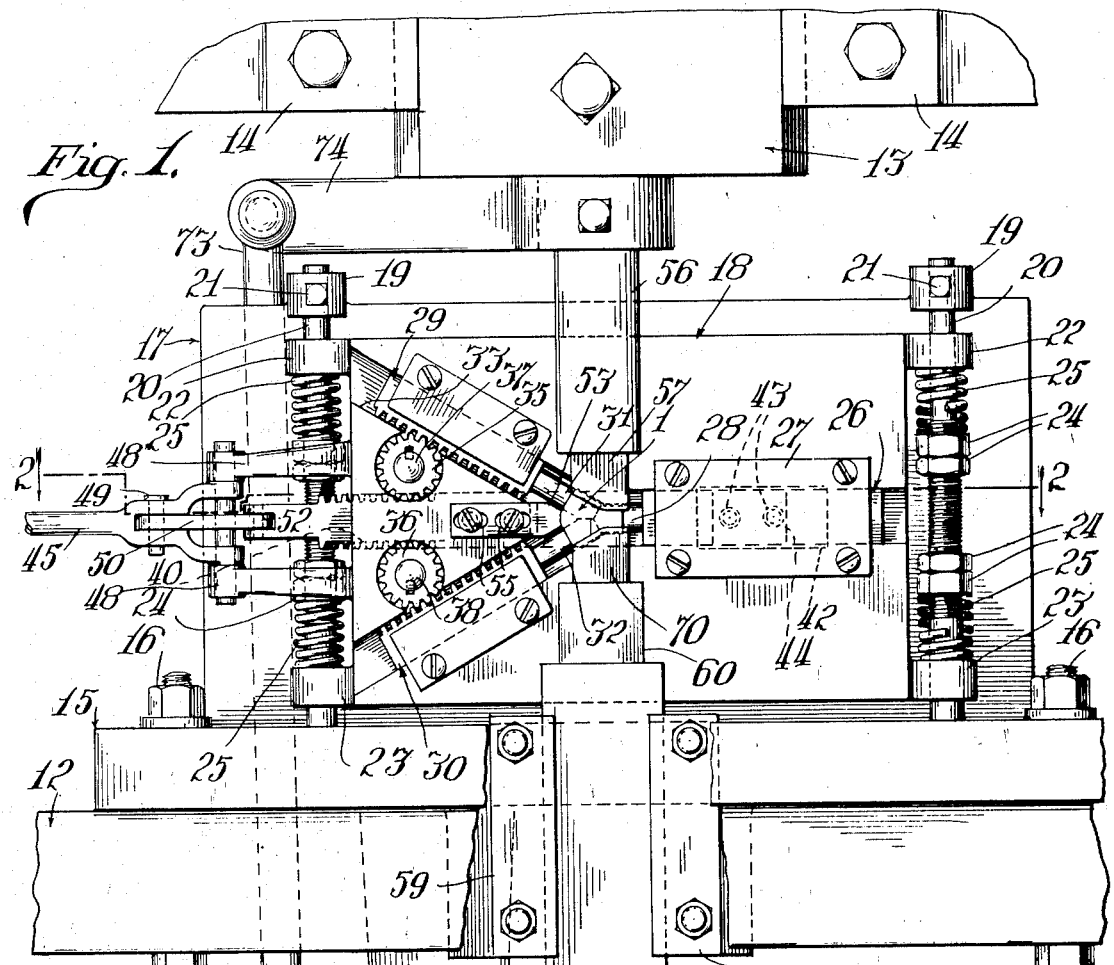
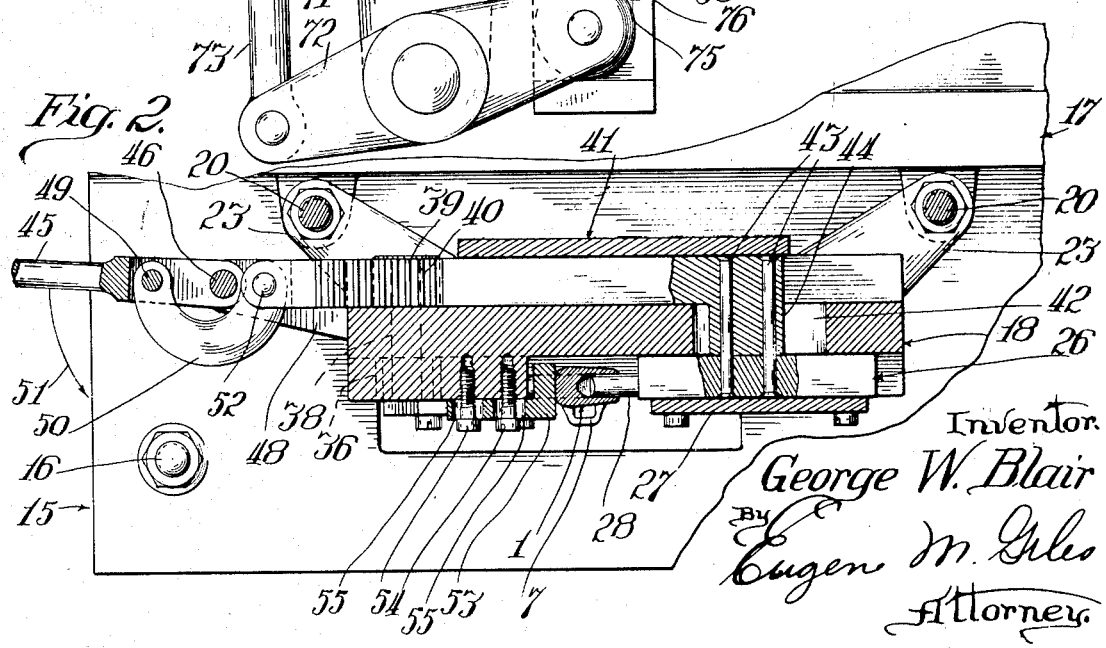
Inventor.
George W. Blair
By Eugen M. Giles
Attorney.

April 21, 1931.  G. W. BLAIR  1,801,325
APPARATUS FOR MAKING FASTENER SLIDERS
Filed July 18, 1925   2 Sheets-Sheet 2
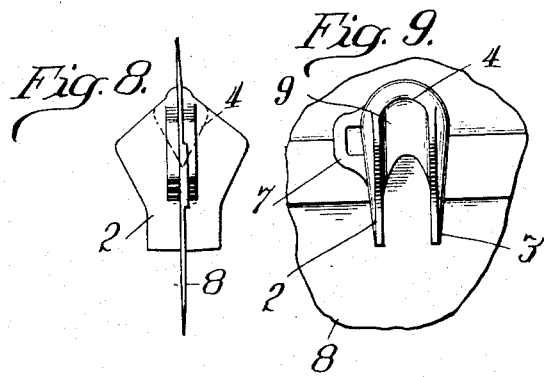
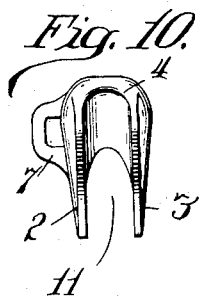
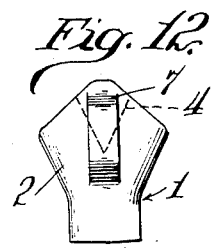
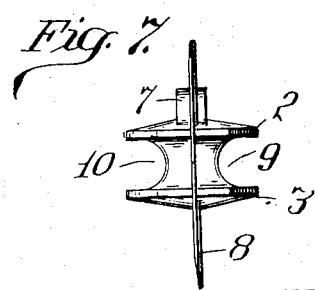
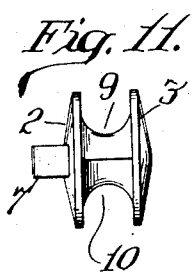
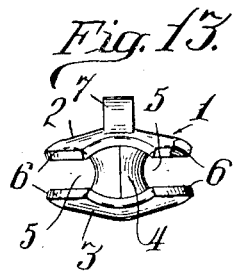
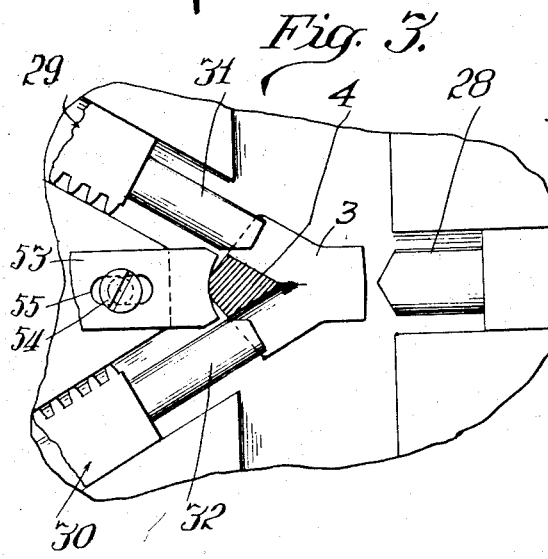
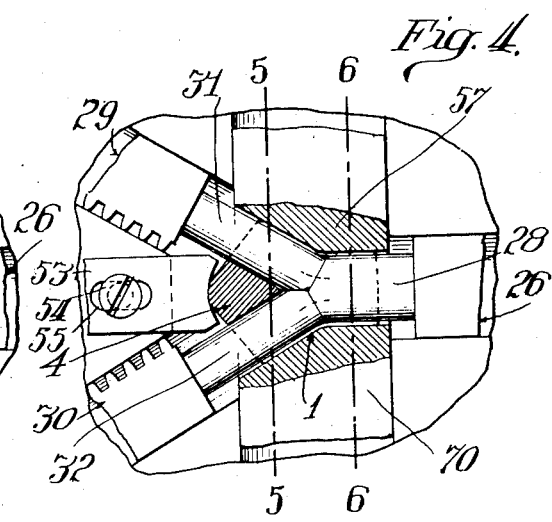
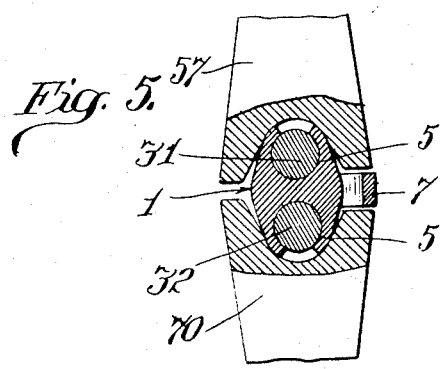
Inventor
George W. Blair
By Eugene M. Giles
Attorney.

Patented Apr. 21, 1931

1,801,325

UNITED STATES PATENT OFFICE

GEORGE W. BLAIR, OF MISHAWAKA, INDIANA, ASSIGNOR TO MISHAWAKA RUBBER AND WOOLEN MANUFACTURING COMPANY, OF MISHAWAKA, INDIANA, A CORPORATION OF INDIANA

APPARATUS FOR MAKING FASTENER SLIDERS

Application filed July 18, 1925. Serial No. 44,638.

My invention relates to automatic or quick operating fasteners and has reference more particularly to the cam member or slider for operating same, and also to the process and apparatus whereby the cam member or slider is made.

In automatic or quick operating fasteners, opposed series of fastener elements are arranged to be interlocked and released by movement of a cam member or slider therealong. This cam member or slider is formed with a pair of angularly related channels, at the opposite sides respectively of a wedge shaped spreader, which converge into a single channel at the end of the slider, and the outer edges of the walls between which the channels are located are bent inwardly to form restricted slots at the outer sides of the channels and to afford internal faces for engaging the fastener elements so as to draw them together into the interlocking relation. The cam members or sliders must be accurately made and capable of withstanding considerable strain, particularly in drawing together the parts which are to be fastened, and it is also important that it should be compact in form and neat appearing. In view of the peculiar form and the difficulty in coring the necessary channels or openings, these cam members or sliders have not been cast or molded, but it has been customary to make them up of front and rear plates which are stamped in the required form and assembled with a wedge shape formation or block therebetween, with such reinforcing as may be readily applied for stiffening the plates against yielding under the strains of operation. Such sliders, however, do not have the rigidity required, if made up in a small compact form, require considerable care to insure uniformity, are unnecessarily expensive to produce and cannot be made in as neat and symmetrical form as desired.

The principal objects of my invention are to provide an improved cam member or slider for quick operating fasteners; to construct the slider in a unitary or one piece form; to distribute the metal so as to properly reinforce the slider and afford ample rigidity; to insure uniformity and accuracy of dimensions; to construct the slider in a small, compact and symmetrical form; to shape the slider by subjecting a casting to forming dies; to provide an improved method and apparatus for making the cam member; and in general to provide a simple, inexpensive, neat appearing and strong cam member or slider for a quick operating fastener.

On the drawings, Fig. 1 is a front view of a machine for shaping my improved cam member.

Fig. 2, a sectional view taken substantially on the line 2—2 of Fig. 1.

Figs. 3 and 4, detail views of the forms and shaping mechanism shown respectively in the position to receive a slider casting and in the forming operation.

Figs. 5 and 6, sectional views taken respectively on the lines 5—5 and 6—6 of Fig. 4.

Figs. 7, 8 and 9, top, front and side views respectively of the slider casting as it comes from the mold.

Figs. 10 and 11, side and bottom views respectively of the slider casting ready for the shaping operation; and Figs. 12 and 13, front and bottom views respectively of the slider after the shaping operation.

Referring to the drawings, the reference numeral 1 indicates the finished slider, consisting of a single piece of material having substantially front and rear plate portions 2 and 3 respectively with a wedge shaped connector or spreader 4 therebetween, forming side channels or grooves 5—5 which merge into a single channel at the apex of the spreader 4. The lateral edges of the plate portions 2 and 3 are bent inwardly as indicated at 6 so that the open sides of the channels or grooves 5 are restricted and internal faces provided for engaging the elements of the fastener to draw them into the interlocking position. The wedge shaped member or connector 4 is in the present case formed with substantially concave lateral faces and the lateral edge portions 6 are bent inwardly on curvilinear lines so that the channels are of substantially rounded form to accommodate rounded fastener elements as for example coils of a spring fastener, or loop shaped elements, although it is to be understood that this form is shown merely for the purpose of illustration and that the slider may be constructed to correspond to other forms of fastener elements without departing from the principles of my invention.

In view of the fact that the plate portions 2 and 3 of the slider must have the lateral edges turned in, a one piece slider cannot be cast readily in the final form on account of the difficult coring operation which would be required. A one piece core could not be used on account of the curve at the juncture of the divergent channels and the end channel, and if a core composed of several pieces were used, it would be impossible to make the casting without internal parting marks which would interfere with the operation of the fastener elements through the slider. The cast or one piece slider is desirable however, inasmuch as it lends itself to a proper distribution of the metal whereby adequate strength and rigidity is obtained without impairing the appearance of the slider, for example, in the illustrated structure the concave lateral formation of the separator portion 4 affords increased material adjacent the front and rear plates 2 and 3 whereby the latter are stiffened, and furthermore the plates 2 and 3 are gradually increased in thickness from their lateral edges to the middle, or are of truss form in cross section so as to attain strength and rigidity and at the same time afford a neat and compact appearance. Strength and rigidity are extremely important in operating members for automatic or quick operating fasteners inasmuch as satisfactory operation of the fastener depends upon proper relative interlocking and releasing movement of the opposed fastener elements and accuracy in interengaging same, and if there is any spring apart or yielding of the opposed channel walls, even to a slight extent, the fastener elements will fail to close together and interlock.

In sliders of this character it is customary to provide a finger grip which is hinged on the front of the slider and capable of being readily grasped for manipulating the slider and in my construction I prefer to form the slider with an integral loop 7 on the front face with which the finger grip may be readily connected.

The slider is preferably die cast, or it may be molded, as for example in plaster of Paris, or otherwise formed somewhat as shown in Figs. 7 to 11 inclusive, with the inner faces of the front and rear plates 2 and 3 substantially parallel and the side channels or grooves 9 and 10 and the end recess 11 entirely open at their outer sides, and in practice a fin 8 usually results at the parting line of the mold and within the aperture of the loop 7, which is removed by a suitable die preliminary to the shaping of the slider, so that the slider blank before it is finally shaped appears substantially as shown in Figs. 10 and 11.

Suitable forms are then placed in the channels 9 and 10 and in the end recess 11 after which the slider with the forms therein is subjected to stamping dies which turn the lateral edges 6 inwardly around the forms so that when the forms are removed, the casting is in the required form.

The stamping dies may operate directly against the front and rear plate portions 2 and 3 if desired, but I prefer to apply the dies edgewise with respect to the plate portions 2 and 3 as in the following described apparatus which is illustrative of one form of mechanism which may be used for accomplishing the shaping of the slider.

This machine, which is illustrated in Figs. 1 to 6 inclusive is made as an attachment for a press which has the usual bed plate 12 and a head 13 mounted in guides 14 to reciprocate to and from the bed plate 12. The slider shaping attachment has a base plate 15 which is secured on the bed plate 12 of the punch press in any convenient manner as by the bolts 16, and has a back plate 17 extending upwardly at the rear. This plate 17 serves to yieldingly support a frame 18 which carries the forms for the slider and permits the latter, on account of the yielding mounting of the frame 18, to center itself between the upper and lower forming dies when the latter are operating on the slider. To afford the resilient mounting of the frame 18 the plate 17 is provided at the top and near each end with forwardly projecting lugs 19 in which the upper ends of the shafts 20 are secured by set screws 21, said shafts having their lower ends engaged in suitable sockets in the base plate 15. The frame 18 has upper and lower apertured ears 22 and 23 respectively at each end slidably engaging the shaft 20 which latter is threaded intermediate of its ends and provided with pairs of nuts 24 thereon. A pair of springs 25 are mounted on each shaft 20 and arranged respectively between the upper pair of nuts 24 and the upper lug 22 of the frame 18 and between the lower pair of nuts 24 and the lower lug 23 so that the frame 18 is normally held in a definite position by the springs 25 but may be shifted vertically as required in the operation of the forming apparatus. Obviously the arrangement of the nuts 24 on the shafts 20 permits adjustment of the springs so that the frame 18 may be located in the proper position and the holding tension increased or decreased as required.

Slidably mounted on the frame 18 is a bar 26 which is held in place by a guide housing 27 attached to the front of the frame 18 and this bar is provided at its inner end with a form 28 which fits into the recess 11 in the end of the slider 1 so that the adjacent lateral edge portions of the slider may be shaped thereagainst in the operation of turning in the edges of the slider.

A pair of rack bars 29 and 30 are also mounted to reciprocate on the frame 18 being angularly disposed with respect to one another as shown and forming with the bar 26 substantially a Y-shaped arrangement, and these bars have on their inner ends the forms 31 and 32 respectively which are adapted to engage in the side grooves 9 and 10 of the slider 1, and have the adjacent lateral edges of the slider 1 bent over thereagainst in the operation of shaping the slider. The ends of the forms 31 and 32 and the end of the form 28 are suitably shaped to fit together as indicated in Fig. 4 thereby substantially filling the grooves 9 and 10 and end recess 11 of the slider when the bar 26 and racks 29 and 30 are projected inwardly.

The rack bars 29 and 30 are located in corner seats 33, formed by a raised portion of the frame 18 between the rack bars 29 and 30, and are held in said seats by angular plates 34 on the frame 18 which project thereover. Each rack bar 29 and 30 meshes with a pinion 35 and 36 respectively on the shafts 37 and 38 which extend through and are journaled in the frame 18, and each shaft is provided at the rear of the frame 18 with a pinion 39 meshing respectively with series of teeth on the opposite sides of a double rack bar 40. This rack bar is confined for longitudinal movement by a housing 41 on the rear of the frame 18 and is connected through a slot 42 in the frame by means of the pins 43 and spacer 44 with the bar 26 so that the latter operates with the rack bar 40. With this construction, when the rack bar is moved toward the right (looking at Fig. 1) the bar 26 and form 28 are moved to the right and the rack bars 29 and 30, through the operation of the pinions 39 and the pinions 35 and 36, are moved to the left so that the forms 31 and 32 are withdrawn from the form 28.

For operating the rack bar 40 a hand lever 45 has a bifurcated end pivoted at 46 on pivot lug extensions 48 of the frame 18 and is connected at a distance from the pivot 46, as at 49, by an arched link 50 to the end of the rack bar 40. This hand lever 45 when moved in the direction of the arrow 51 shown in Fig. 2 operates the rack bar 40 so as to separate the forms 28, 31 and 32, while movement thereof in the reverse direction brings the forms together in the position shown in Fig. 4 in which position the pivot point 49 is sufficiently beyond the center line of the pivots 52 and 46 so that it serves as a lock to hold the forms against displacement in the operative position.

In the operation of the device the forms 28, 31 and 32 are first separated to the position shown in Fig. 3 whereupon the slider blank such as shown in Figs. 10 and 11 is placed in position as indicated in Fig. 3. While held in this position the lever 45 is operated to project the forms 28, 31 and 32 inwardly to the position shown in Fig. 4 in which position the forms 31 and 32 occupy the divergent side grooves 9 and 10 of the slider and the form 28 occupies the end recess 11.

In order to insure proper positioning of the slider on the forms 28, 31 and 32 and to avoid shifting thereof away from the form 28 at or previous to the operation of the forming dies, I have provided a stop 53 on the frame 18, between the forms 31 and 32, against which the large end of the slider abuts. This stop is preferably secured to the frame 18 by cap screws 54 which extend through slots 55 in the stop and permit adjustment of the stop if required.

The forms 28, 31 and 32 are positioned so as to hold the slider blank in the line of operation of the reciprocating head 13 of the punch press, said head having an extension 56 depending therefrom and carrying at its lower end a die 57 having a transversely curved, angularly extending channel in the lower face, as indicated in Figs. 4, 5 and 6, which cooperates with the forms 28 and 31 to turn in the upper edges of the slider blank in the manner shown in Figs. 5 and 6.

A lower head 58 is mounted in guides 59 on the base plate 15, in alignment with the extension 56 of the upper head 13, and has an extension 60 with a die 70 at the upper end of the same form as the die 57 and adapted to cooperate with the forms 32 and 28 to shape the lower edges of the slider blank as shown in Figs. 5 and 6.

It is desirable that the dies 57 and 70 operate simultaneously in opposite direction so as to clamp the slider blank and forms 28, 31 and 32 therebetween and to this end the base plate 15 is formed with a depending hanger 71 carrying a rocker arm 72 which has the outer end connected by a link 73 with a lateral extension 74 on the extension 56 of the head 13. The inner end of the rocker arm 72 is provided with a roller 75 operating in a transverse groove 76 in the lower end of the lower head 58 so that when the upper head 13 is driven downwardly the lower head 58 is driven upwardly to clamp the slider blank and the forms therein between the dies 57 and 70, while at the same time the resilient mounting of the frame 18 permits the slider and the forms to center themselves between the dies and thereby equalize the pressure of the dies against the upper and lower portions of the slider blank.

The bed plates of punch presses are usually provided with a large opening, and the slider forming attachment which I have described is adapted to be mounted on the bed plate of an ordinary punch press with the portions thereof which depend from the base plate 15 extending through the opening in the bed plate so that a punch press of ordinary construction may be readily equipped with my attachment for shaping the slider blanks. It is merely necessary to mount the attachment on the bed plate 12 by means of the bolts 16 and then secure the extension 56 to the head 13, with the laterally projecting arm 74 thereon, true up the machine and make any required adjustments whereupon the attachment is ready for use.

With this machine a cast slider blank may be readily shaped into the form required and the sliders produced are uniform and accurately shaped inasmuch as the metal is confined between the forms 28, 31 and 32 and the upper and lower dies 57 and 60. Any suitable metal may be employed for making the sliders, some such metal as bronze being preferred, however, as it is durable and withstands wear and moreover, it attains a hardness under the stamping operation which gives the slider increased strength.

With my present method and apparatus the slider may be cast in a neat compact form and the metal distributed so as to obtain the proper reinforcing to insure a more substantial and rigid construction than it is possible to obtain in an assembled slider without objectionably increasing the size thereof.

While I have shown and described my invention in a preferred form, I am aware that various changes and modifications may be made without departing from the principles of my invention and I, therefore, do not propose to limit the patent granted hereon otherwise than necessitated by the prior art.

I claim as my invention:—

1. In an apparatus for shaping a slider for a quick operating fastener, the combination of opposed dies, and a form having a plurality of separable portions mounted respectively for movement along relatively divergent lines to and form a position between the dies to engage grooves in the slider and cooperate with the dies to shape the slider.

2. In an apparatus of the class described, the combination of a pair of relatively reciprocable dies, and a form having a plurality of portions each mounted to move along a path at an angle to the path of movement of the other portions of the form to and from a position between the dies to engage grooves in the edges of a slider blank, said forms being adapted to have edge portions of the walls of the grooves bent over thereagainst by the dies.

3. In an apparatus of the class described, the combination of a form having a plurality of separable portions in substantially a Y-shaped relation, said portions being movable along separate angularly related paths for engaging side grooves and an end recess of a slider blank, and a pair of dies operable to and from the forms for bending the edges of the slider over against the forms.

4. In an apparatus of the class described, the combination of a resiliently mounted frame, a reciprocable form on the frame comprising a plurality of portions in substantially a Y-shaped relation and each portion being adapted for movement along a separate path in line with a branch of the Y to engage in side grooves and an end recess of slider blank, and a pair of dies simultaneously reciprocable to and from the forms for clamping the slider blank and forms therebetween.

5. In an apparatus of the class described, the combination of a pair of dies, a floating support having a form mounted thereon for internally holding a slider blank between the dies, and mechanism for simultaneously actuating the dies to clamp the slider blank and form therebetween so as to turn the edges of the blank inwardly over the form.

6. In an apparatus of the class described, the combination of a pair of dies, a form comprising a plurality of cooperable portions adapted for radial movement in different directions to engage respectively in an end recess and divergent side channels of a slider blank to hold the latter edgewise between the dies, and mechanism for simultaneously actuating the dies to clamp the slider blank edgewise therebetween and turn the edges of the blank inwardly over the form.

7. In an apparatus of the class described, the combination of a pair of dies, a three-piece form for supporting a slider blank between the dies, said form comprising a part engaging in the end recess of the slider blank and a pair of divergent parts which engage together and against the first mentioned part to form a substantially solid Y-shaped form, and mechanism for simultaneously engaging the edges of the slider blank flanges at opposite sides of the three-piece form to bend said edges inwardly along the sides of the form, each of said parts of the form being movable in a separate radial path to and from a position adjacent said mechanism.

8. In an apparatus of the class described, the combination of a main support, an auxiliary support resiliently mounted on the main support, a three-part form mounted on the auxiliary support and comprising a part adapted to engage in the end recess of a slider blank and a pair of divergent parts adapted to engage respectively in recesses at opposite sides of the slider blank, mechanism for simultaneously operating the three parts of the form to and from an assembled position for holding the slider blank thereon, and a pair of dies mounted on the main support and reciprocable to and from the three-part form for turning the edges of the slider blank thereon inwardly against the said form.

9. In a forming mechanism for fastener sliders, the combination of a support, a form thereon having three portions attached at their outer ends to the support and having their free inner ends projecting inwardly along radial lines in substantially Y-shape, and means on the support for relatively adjusting one of said portions to and from the other two portions.

10. In a forming mechanism for fastener sliders, the combination of a support, a form thereon having three portions attached at their outer ends to the support and having their free inner ends projecting inwardly along radial lines and butted together endwise in substantially Y-shape, a stop between an adjoining pair of said portions and means on the support for relatively adjusting the other of said portions to and from the said portions between which the stop is located.

11. In a forming mechanism for fastener sliders, the combination of a form having radially disposed angularly related branches arranged substantially in Y-shape, a pair of dies between which the form is interposed, a support for the form, and means on the support for operating at least two of the branches of the form along their respective radial lines to and from the other branch.

12. In a forming mechanism for fastener sliders, the combination of a form having radially disposed angularly related branches arranged substantially in Y-shape, a pair of dies, a support for the form mounted to automatically center the form between the dies, and means on the support for moving at least one of the branches of the form to and from the other branches.

13. In a forming mechanism for fastener sliders, the combination of a pair of dies and a substantially Y-shaped form comprising a leg portion and a pair of divergent branches, said dies and divergent branches of the form being mounted for movement along substantially radial lines lying substantially in the plane of the axis of the leg portion of the form.

14. In a forming mechanism for fastener sliders, the combination of a substantially Y-shaped form having three angularly related sections movable along independent radial lines to and from a slider engaging position, and a pair of dies movable to and from the lateral edges of the Y-shaped form to engage the slider on the form, said sections and dies being mounted for movement in substantially the same plane to and from the slider engaging portion.

15. In an apparatus for shaping the flanges of a fastener slider, the combination of a substantially Y-shaped form comprising a plurality of separable sections movable to and from a position to engage between the flanges of the slider, and die means movable to and from the form and having portions co-operating therewith to simultaneously bend a plurality of slider flanges against lateral edge portions of the Y-shaped form and at the same time correspondingly indent said flanges between their ends.

16. In an apparatus for shaping the flanges of a fastener slider, the combination of a substantially Y-shaped form comprising a plurality of separable sections movable to and from a position to engage between the flanges of the slider, and a die movable to and from the form and having portions co-operating therewith to simultaneously bend a pair of corresponding spaced slider flanges inwardly toward one another along the lateral edge of the Y-shaped form and at the same time correspondingly indent said pair of flanges approximately midway between their ends.

17. In an apparatus for shaping the flanges of a fastener slider, the combination of a substantially Y-shaped form comprising a plurality of separable sections movable to and from a position to engage between the flanges of the slider and a die movable in the plane of the Y-shaped form to and from a lateral edge thereof and having an elongated longitudinally bent channel in the operating face thereof co-operating with the lateral edge portion of the Y-shaped form to simultaneously bend a pair of corresponding spaced slider flanges inwardly toward one another against the lateral edge of the form and at the same time to indent said pair of flanges approximately midway between their ends.

18. In a forming mechanism for fastener sliders, the combination of a substantially Y-shaped form comprising a plurality of separable sections movable to and from a slider engaging position, and a pair of dies at opposite sides respectively of and movable in the plane of the Y-shaped form, each die having an elongated longitudinally bent channel in the operating face thereof conforming to and adapted to embrace the corresponding edge portion of the form.

GEORGE W. BLAIR.